US006736426B2

(12) United States Patent
Winters et al.

(10) Patent No.: US 6,736,426 B2
(45) Date of Patent: May 18, 2004

(54) VARIABLE PROFILE AIR BAG RESTRAINT

(75) Inventors: Mark Thomas Winters, Troy, OH (US); Stephanie L Dunkle, Springboro, OH (US); Ryan Todd Pinsenschaum, Vandalia, OH (US); Laura Adelle Hawthorn, Tipp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 175 days.

(21) Appl. No.: 09/951,809

(22) Filed: Sep. 13, 2001

(65) Prior Publication Data

US 2002/0036400 A1 Mar. 28, 2002

Related U.S. Application Data

(63) Continuation-in-part of application No. 09/672,474, filed on Sep. 28, 2000.

(51) Int. Cl.[7] .............................................. B60R 21/16
(52) U.S. Cl. .................................................. 280/743.2
(58) Field of Search ........................ 280/743.2, 728.1, 280/743.1

(56) References Cited

U.S. PATENT DOCUMENTS 5,280,953 A  * 1/1994  Wolanin et al. ......... 280/743.2
5,308,113 A    5/1994  Moriset ..................... 280/743
5,489,119 A    2/1996  Prescaro et al. ......... 280/743.2
5,762,367 A    6/1998  Wolanin .................... 280/736
5,887,894 A    3/1999  Castagner et al. ....... 280/743.2
6,039,346 A    3/2000  Ryan et al. ................ 280/736
6,076,854 A    6/2000  Schenck et al. ......... 280/743.2
6,123,358 A    9/2000  Ryan et al. ................ 280/739
6,237,949 B1   5/2001  Nozumi et al. ........... 280/735
6,290,257 B1   9/2001  Bunce et al. .............. 280/739
6,390,501 B1   5/2002  Greib et al.
6,561,545 B2   5/2002  Greib et al.
6,422,597 B1 * 7/2002  Pinsenschaum et al. . 280/743.2
6,425,603 B1   7/2002  Eschbach .................. 280/743.2
6,592,146 B2   7/2003  Pinsenschaum et al.

FOREIGN PATENT DOCUMENTS

DE       19756977    12/1997  ........... B60R/21/16
DE       19813832     3/1998  ........... B60R/21/16
JP        2-37060  *  2/1990  ............... 280/743.2

* cited by examiner

Primary Examiner—Eric Culbreth
(74) Attorney, Agent, or Firm—Scott A. McBain

(57) ABSTRACT

An air bag assembly including an inflatable air bag cushion operatively attached to one or more profile restricting tether elements having an operative length which may be adjusted to provide desired inflation and impact response characteristics. The tether elements may be of actuated or self adjusting operative length to provide desired tension characteristics for various impact conditions.

8 Claims, 15 Drawing Sheets

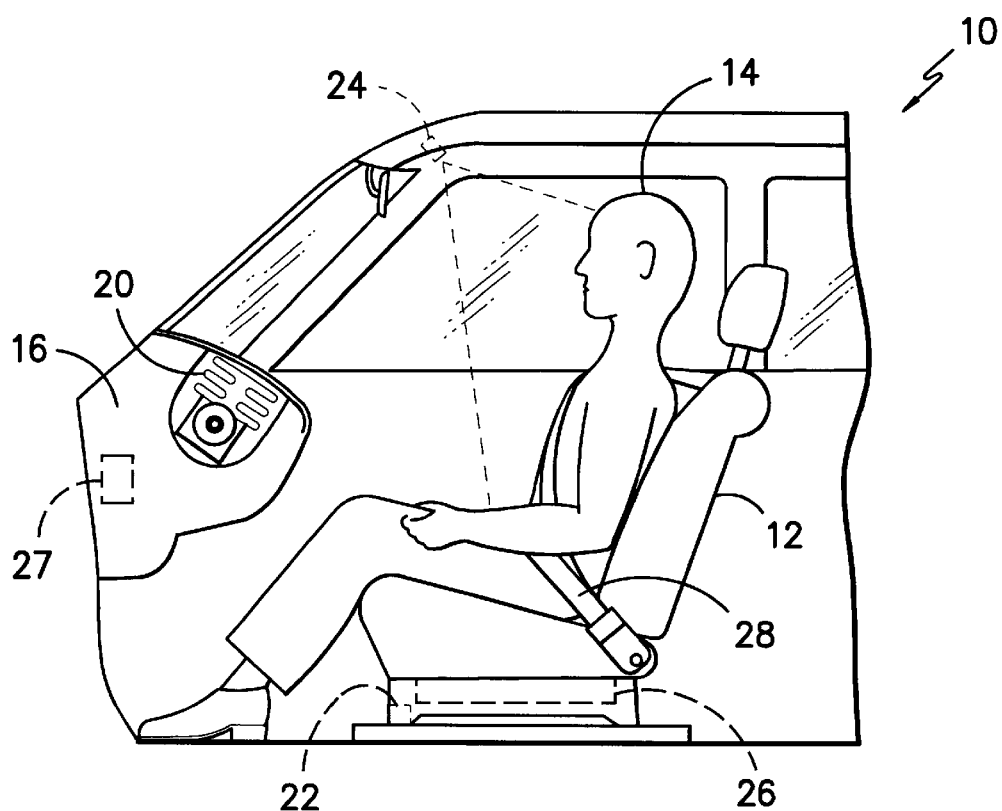
FIG. −1−

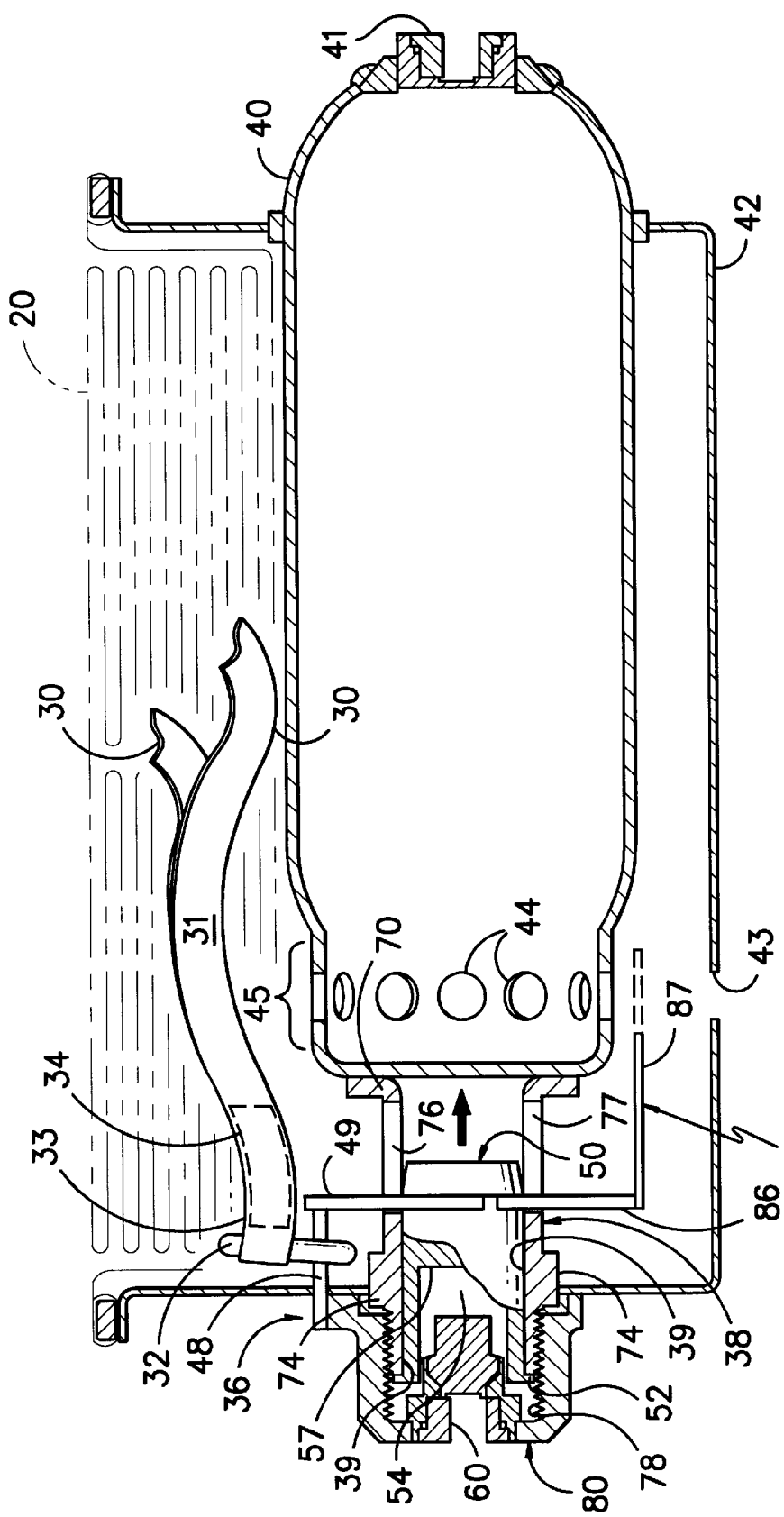
FIG. -2-

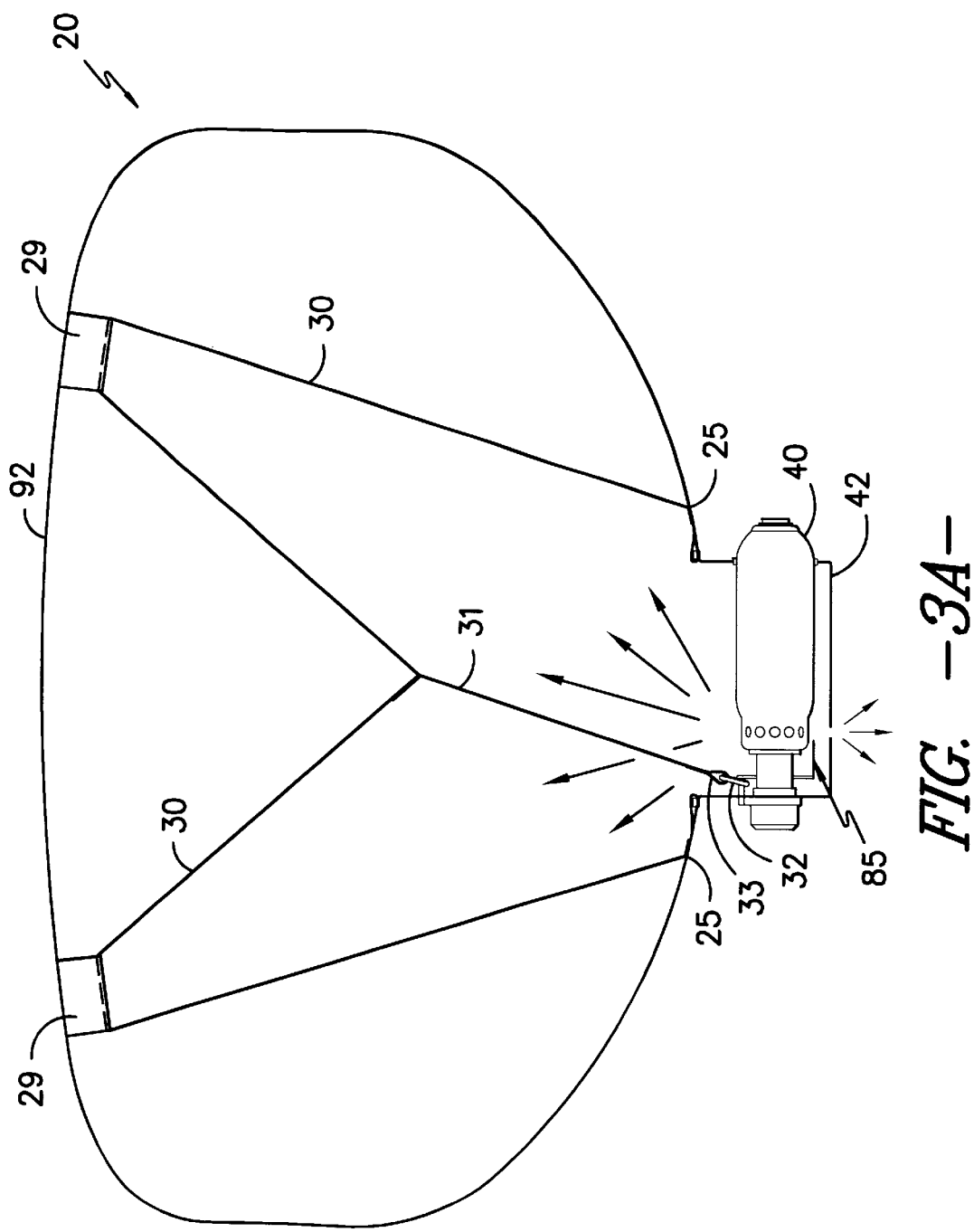

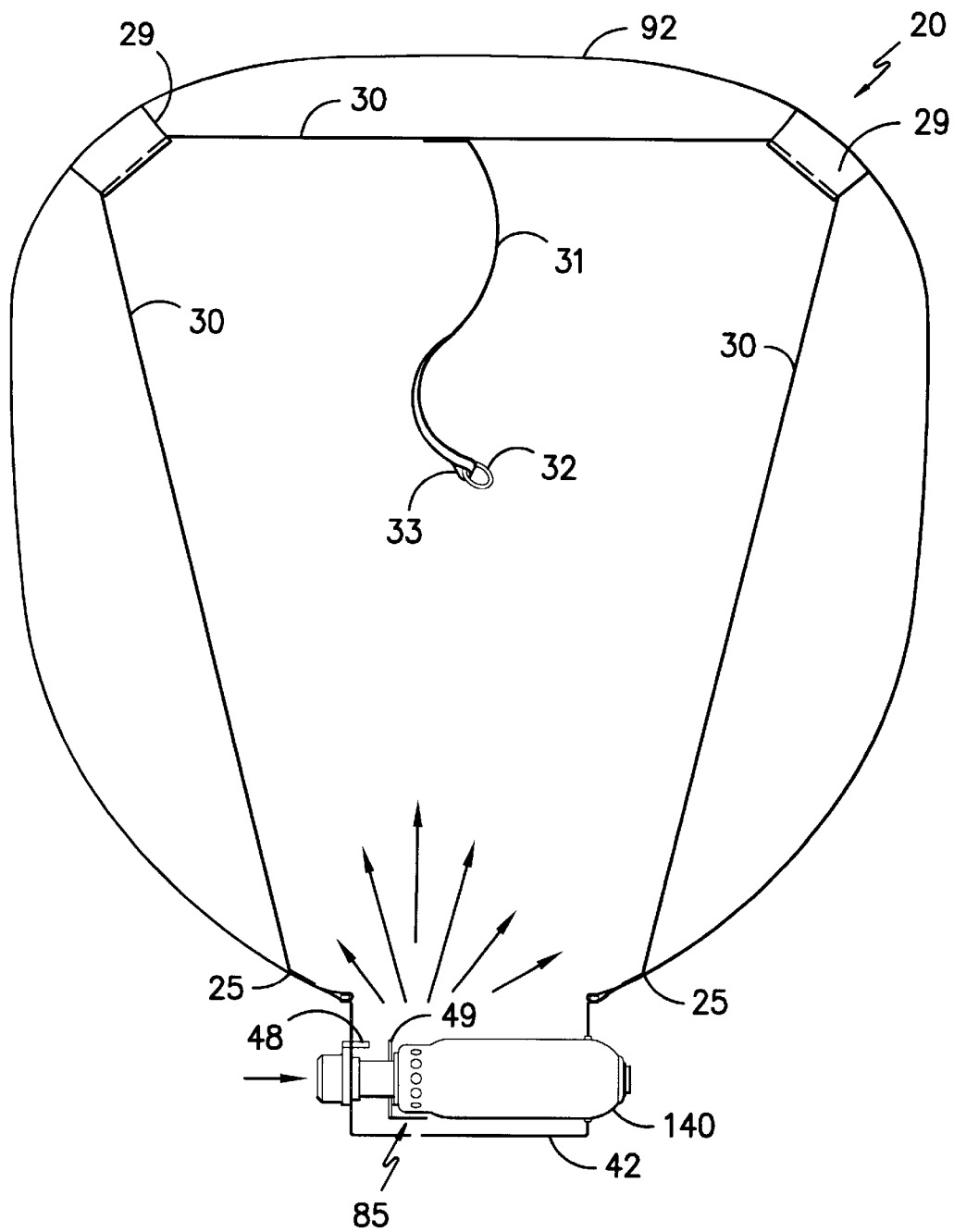
FIG. —3B—

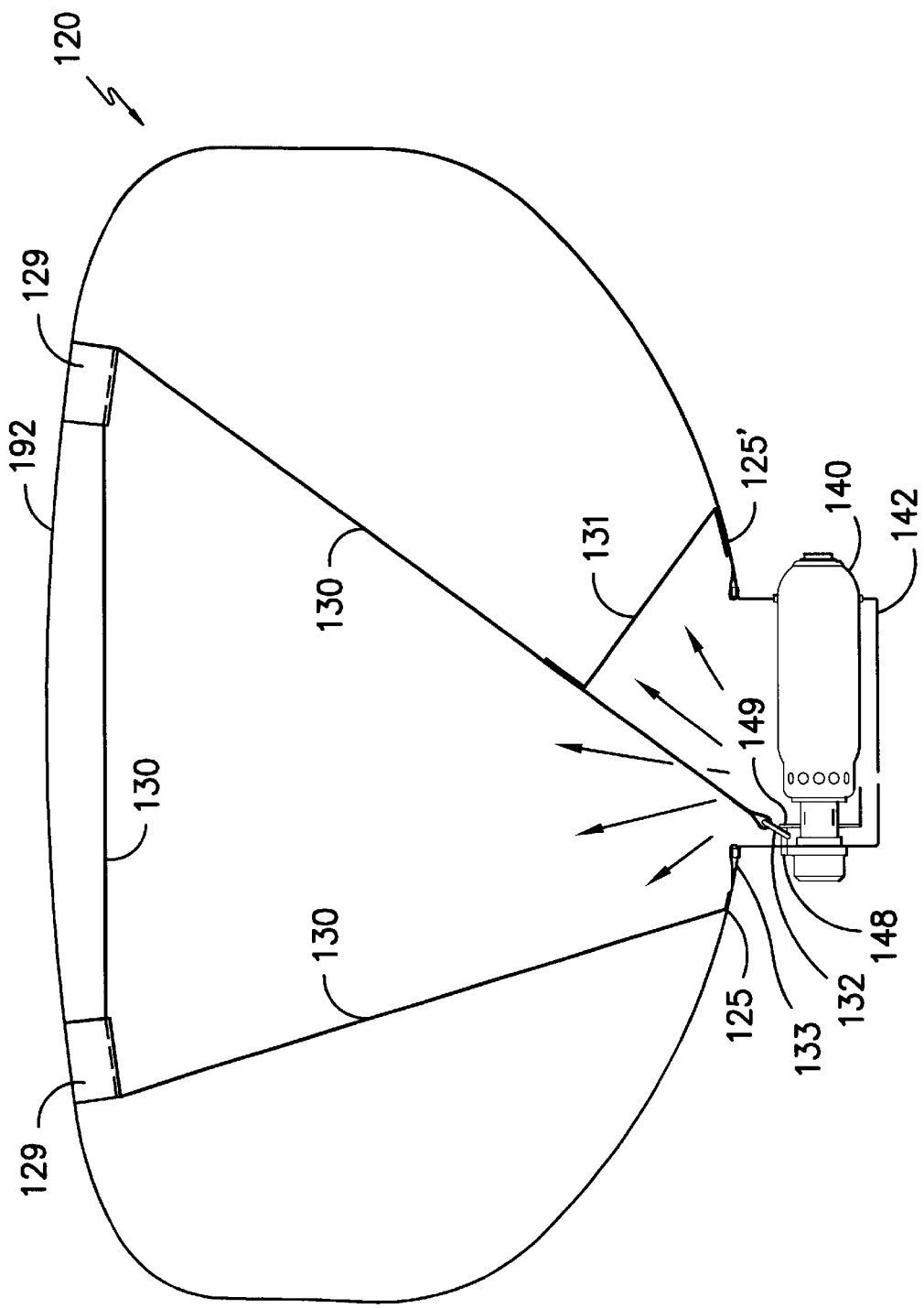
FIG. -4A-

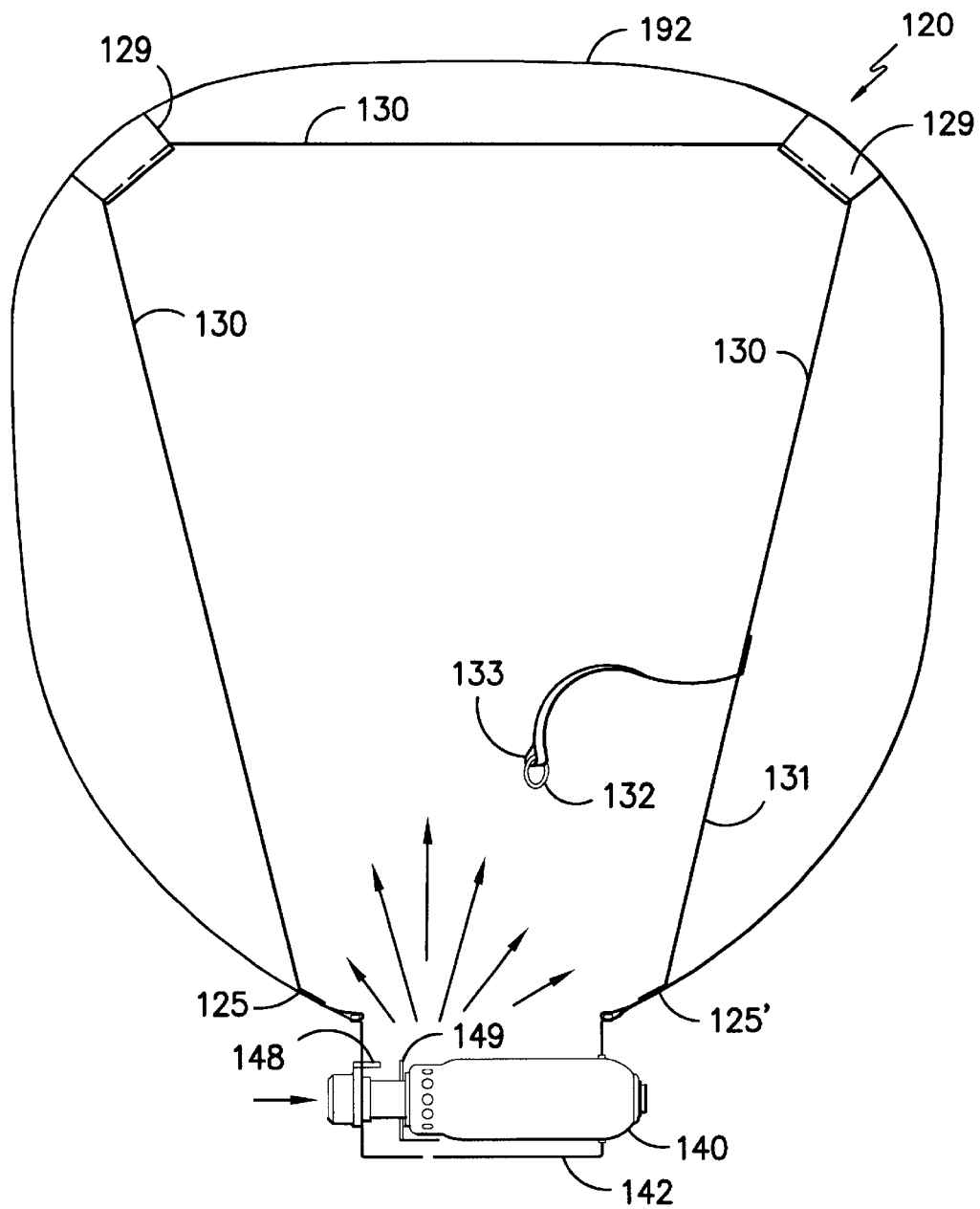
FIG. —4B—

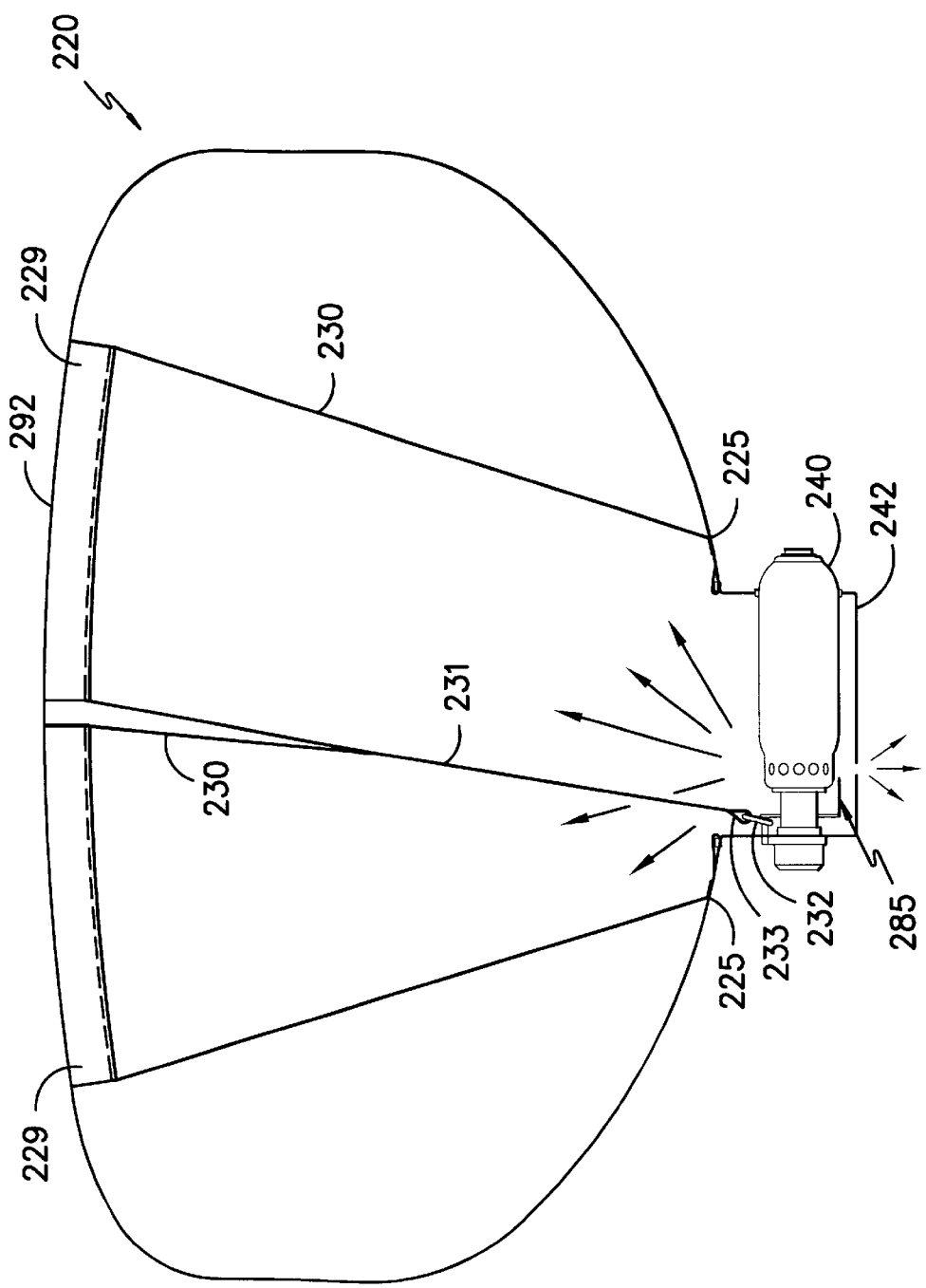

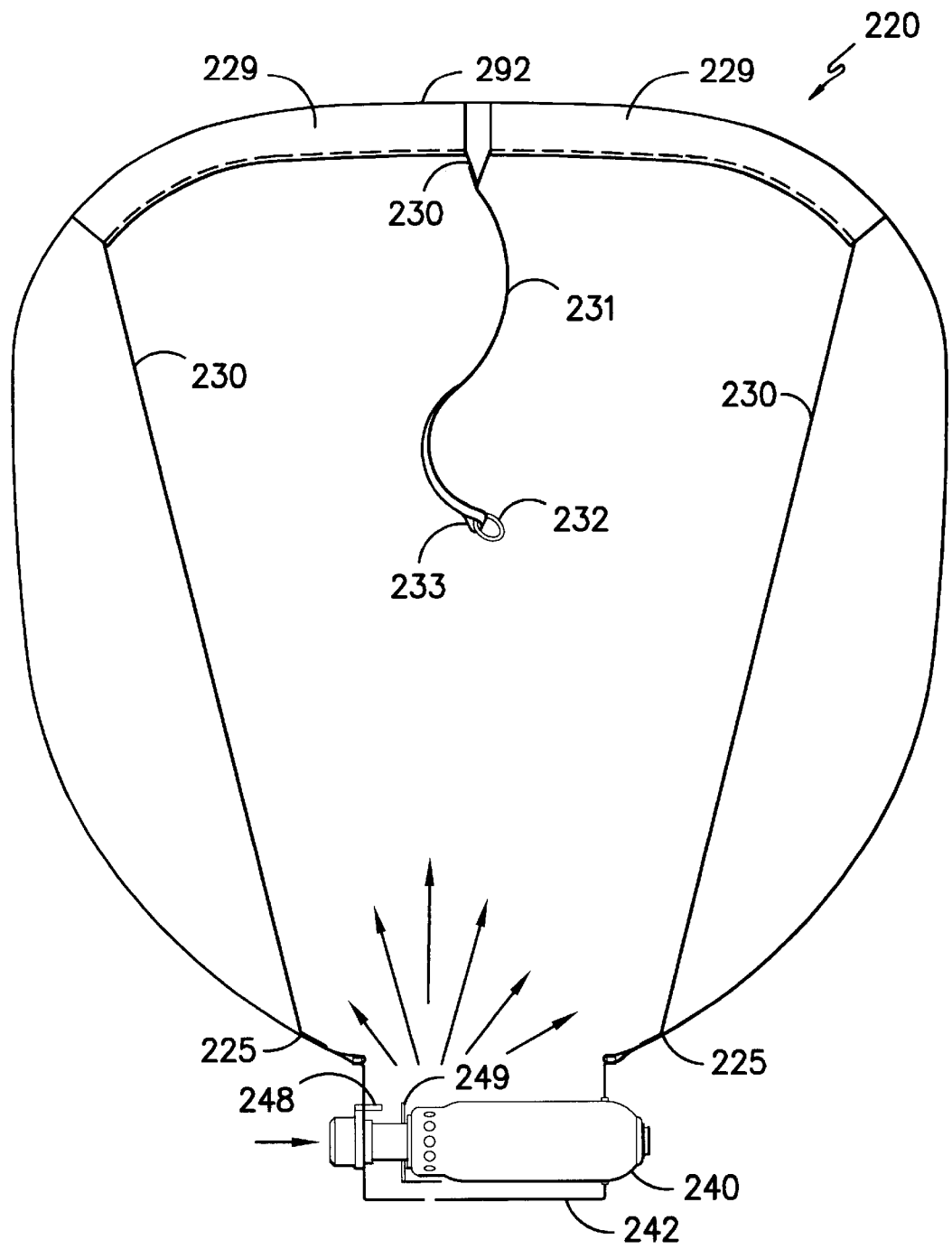
FIG. —5B—

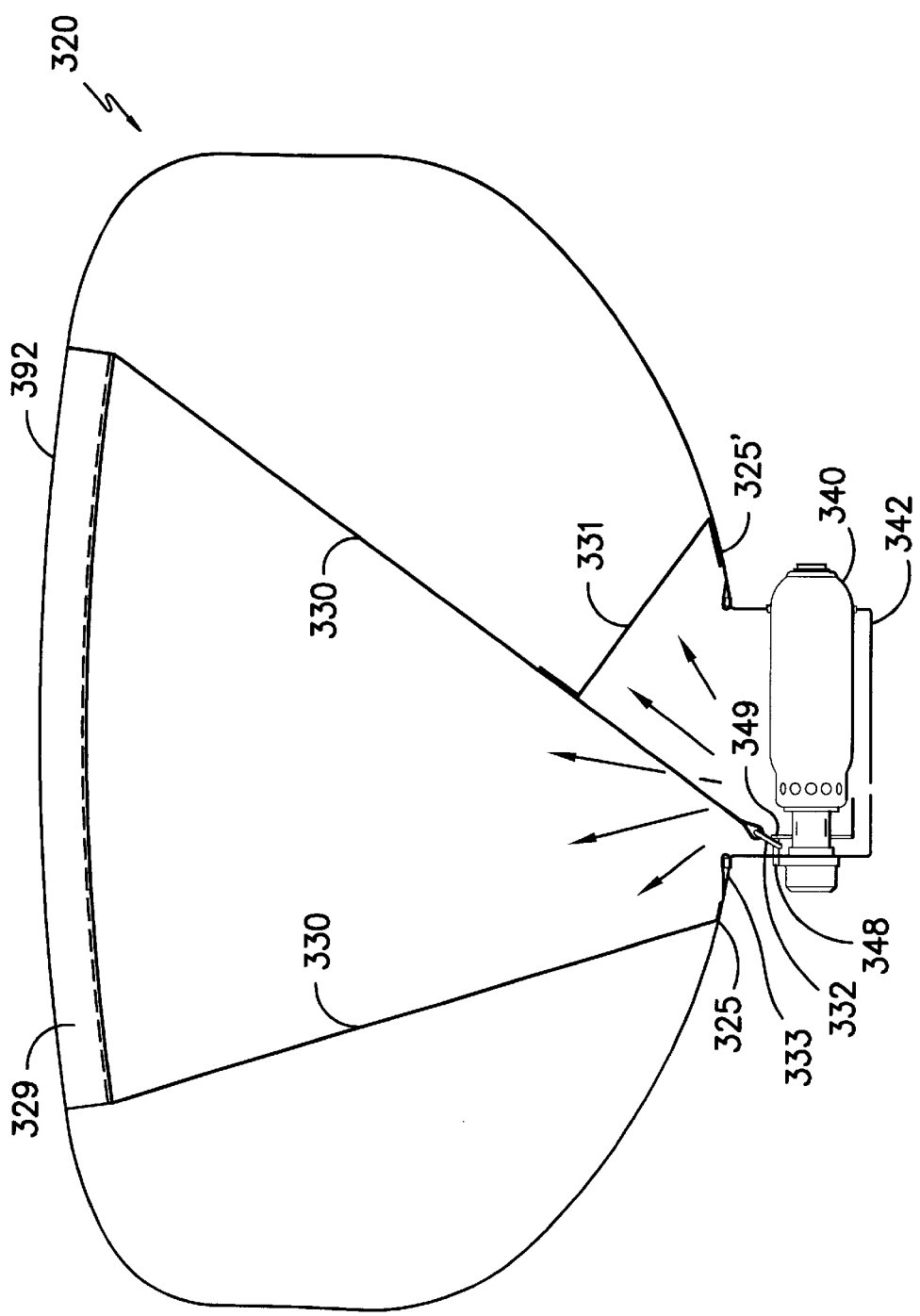
FIG. -6A-

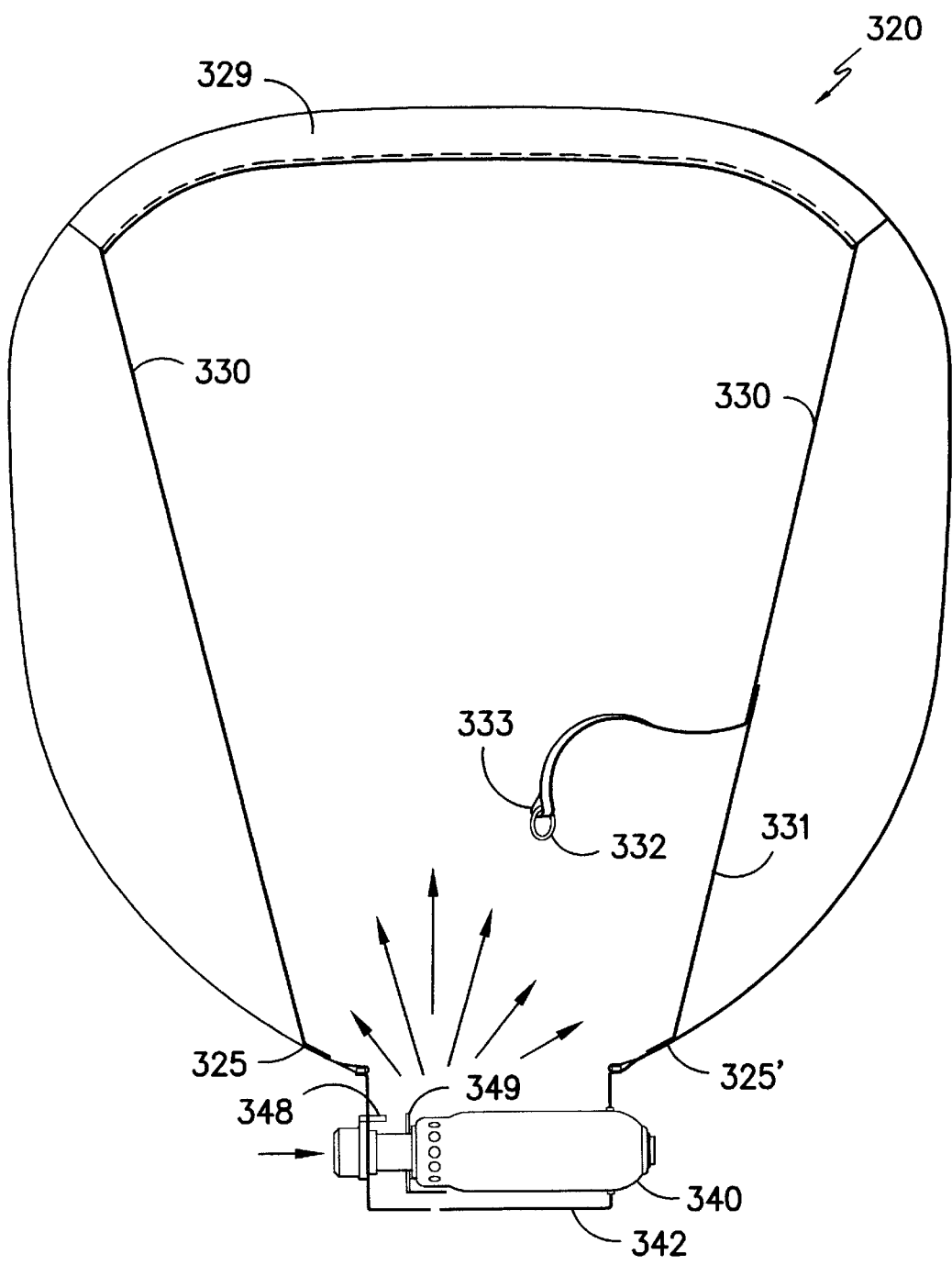
FIG. -6B-

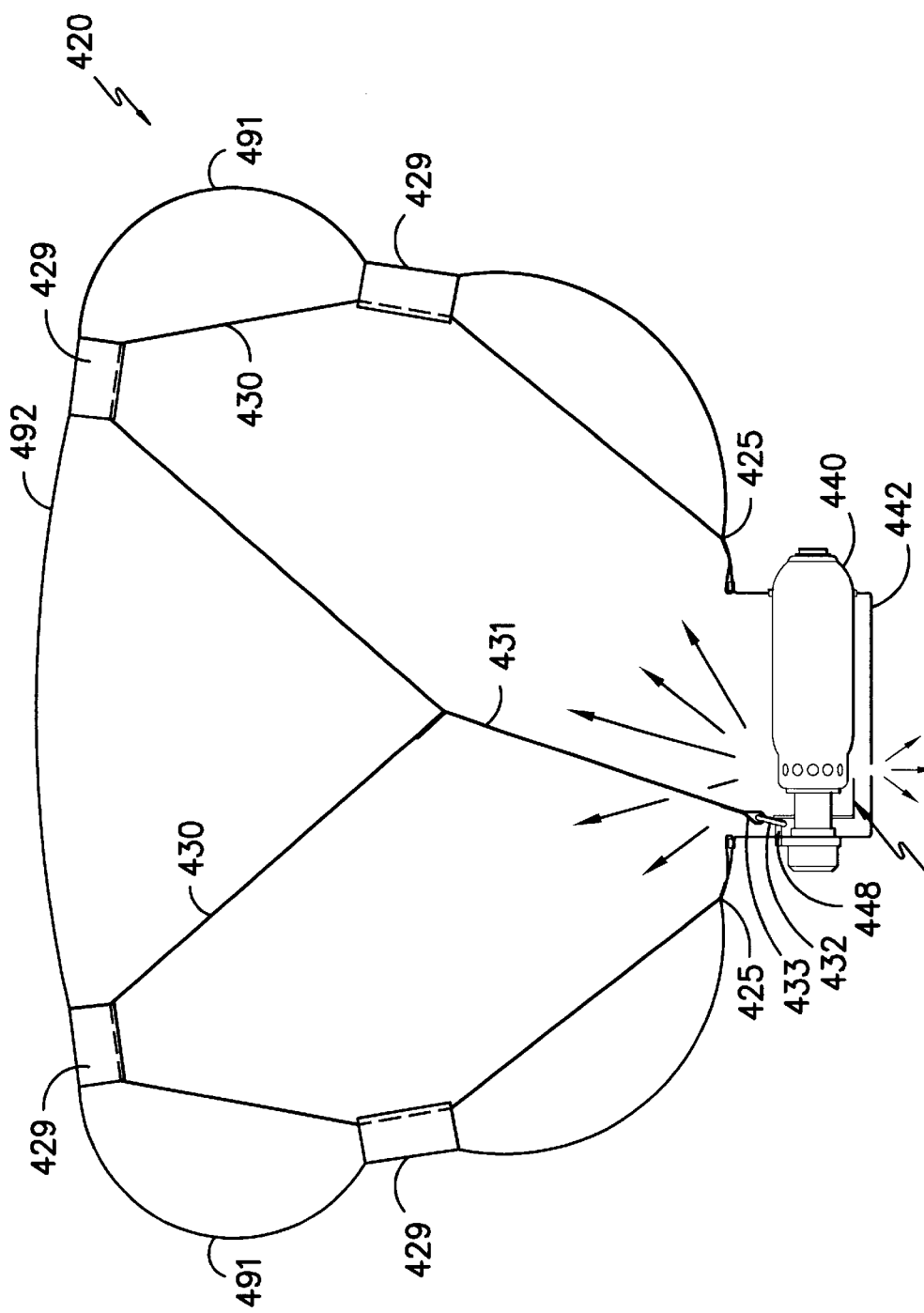
FIG. -7A-

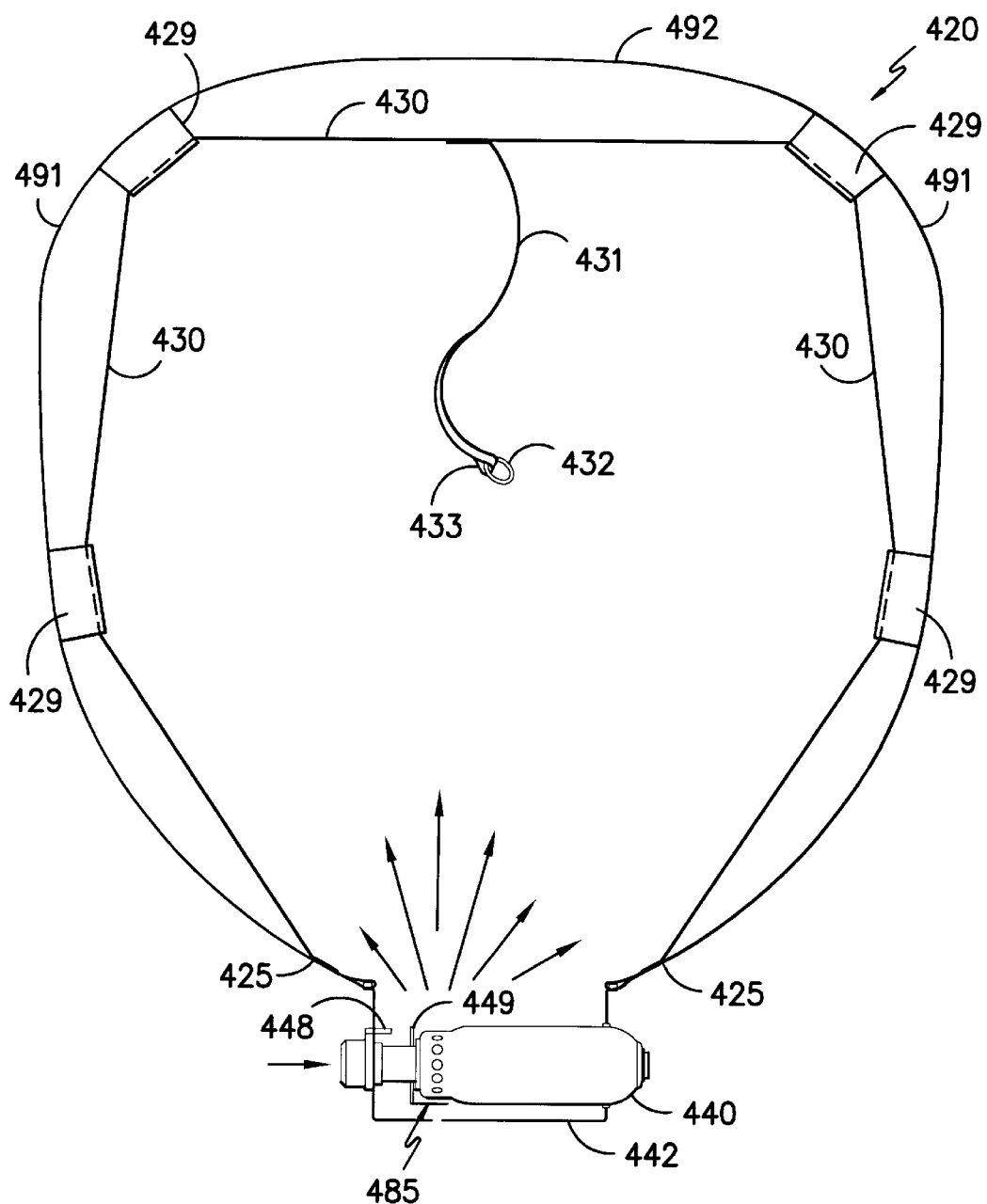
FIG. -7B-

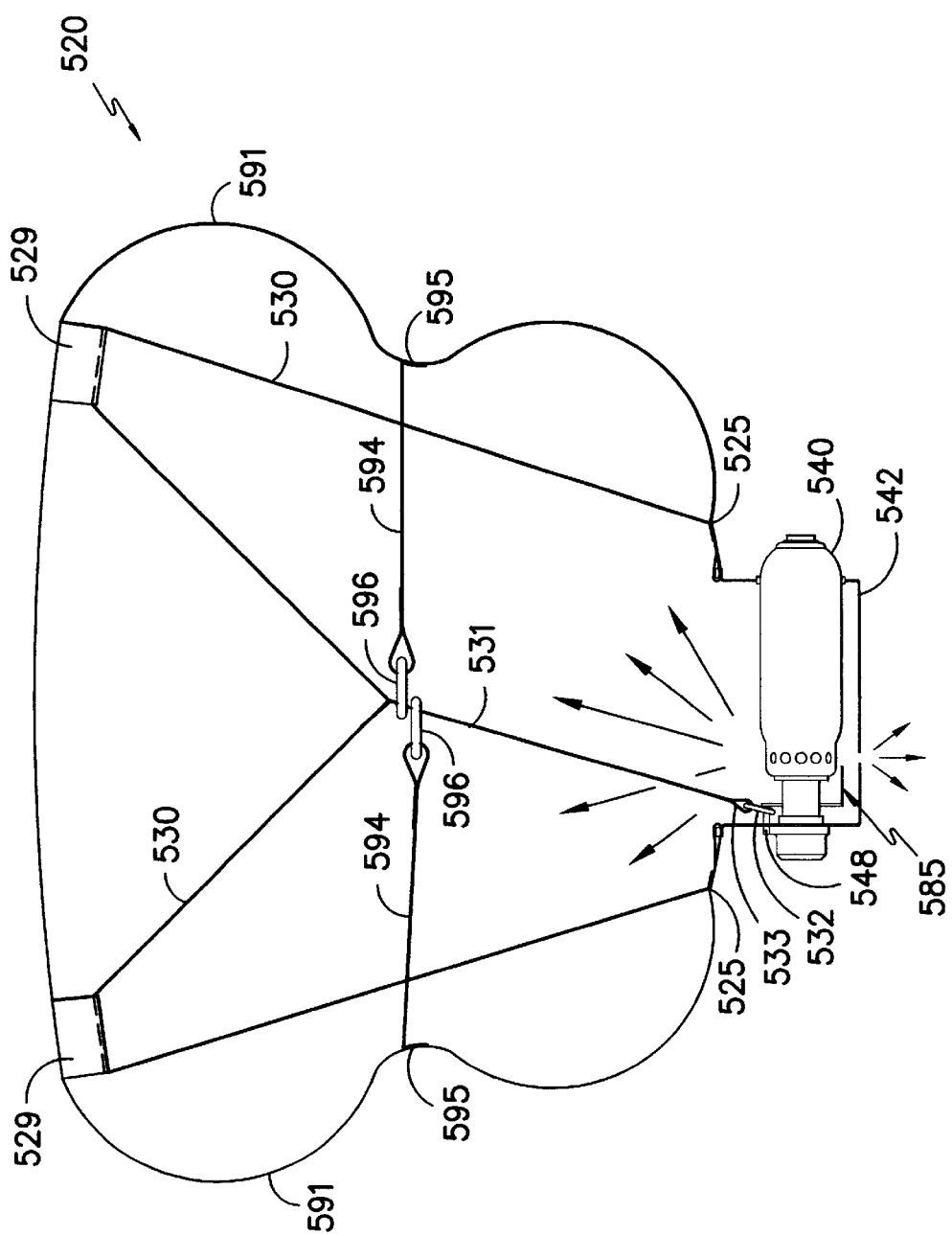

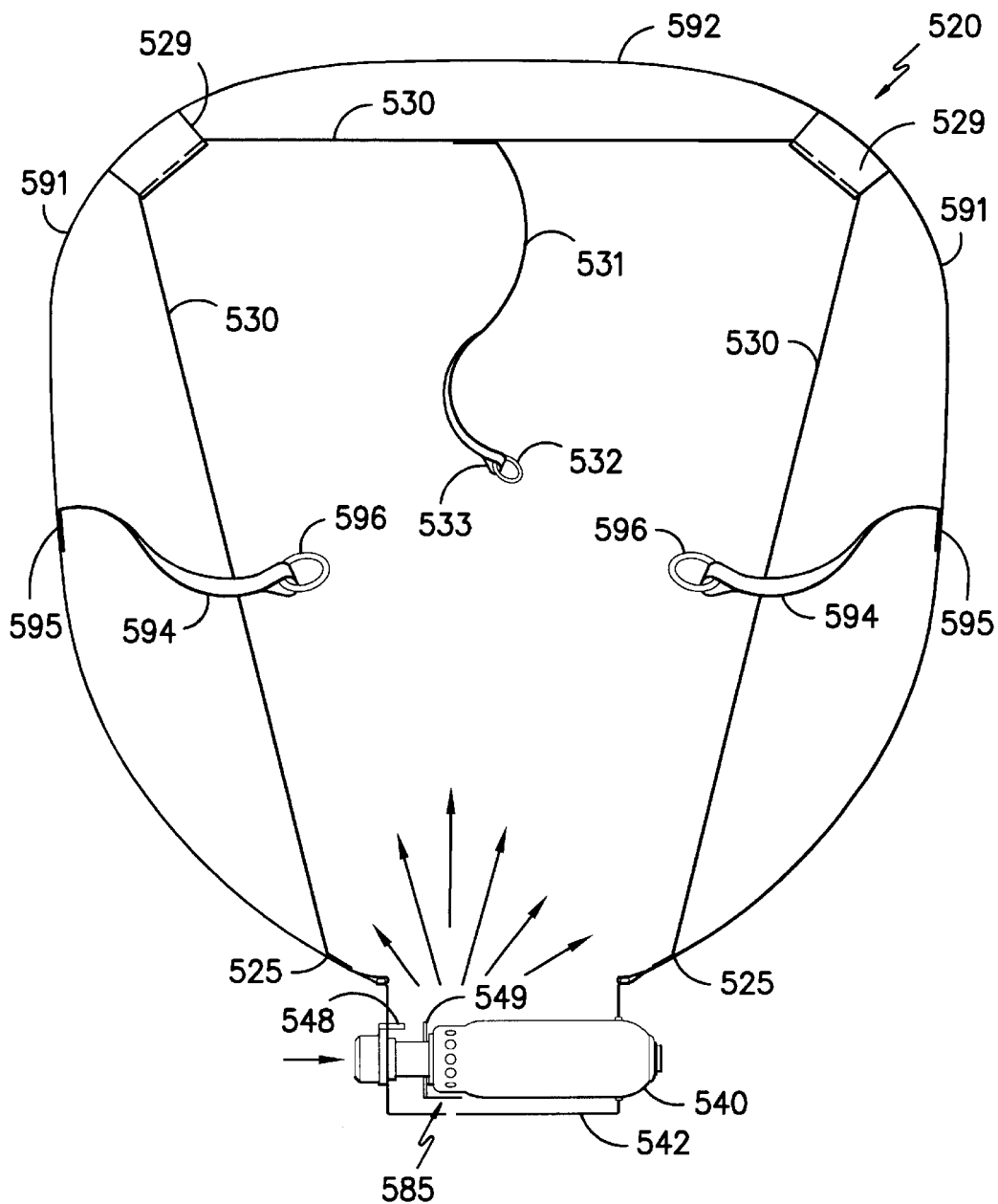
FIG. -8B-

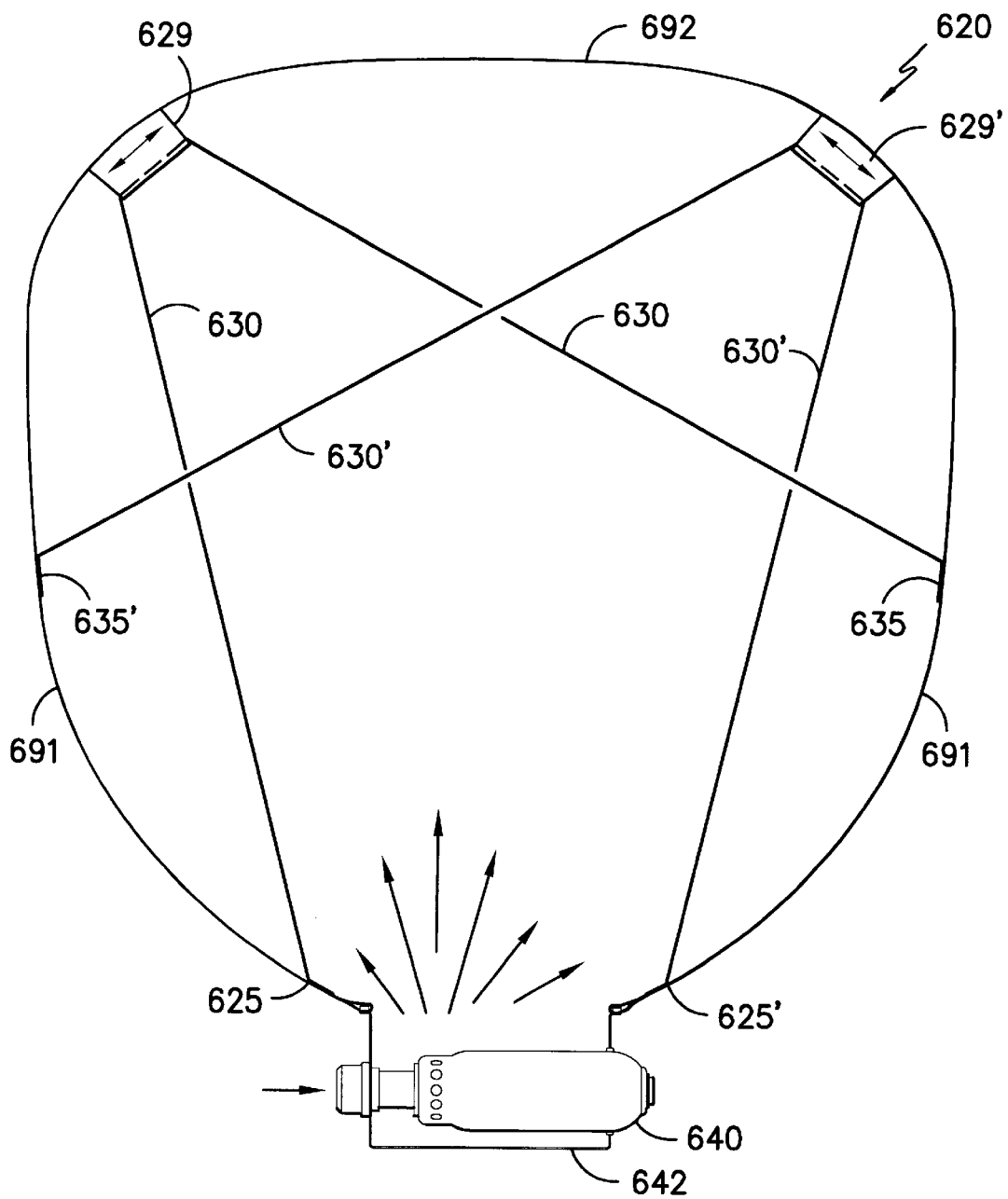
FIG. —9—

VARIABLE PROFILE AIR BAG RESTRAINT

CROSS-REFERENCE TO RELATED APPLICATION

This application is a Continuation-In-Part of copending U.S. application Ser. No. 09/672,474 in the name of Ryan T. Pinsenschaum et al. having a filing date of Sep. 28, 2000.

TECHNICAL FIELD

This invention relates to an air bag assembly, and more particularly to an air bag assembly including an inflatable air bag cushion and one or more tethering elements of variable operative length in attached relation to surfaces of the air bag cushion wherein the inflated profile of the air bag cushion is controllable by varying the operative length of the tethering elements during use of the air bag cushion. The profile of the air bag cushion may be adjusted based upon the measured size and/or position of the vehicle occupant to be protected.

BACKGROUND OF THE INVENTION

It is well known to provide an air bag assembly including an inflatable air bag cushion for protecting the occupant of a transportation vehicle. In an automotive vehicle such air bag assemblies are typically located within the hub of the steering wheel and in a recess in the vehicle instrument panel for protection of the vehicle occupants seated in opposing relation to such assemblies. Additional air bag assemblies may be located within the seats and/or door panels for protection of the occupants during a side-impact event. It is also known to utilize inflatable curtain-like structures for deployment from the structural pillars or roof line of the motor vehicle so as to promote restraint and protection of the vehicle occupant during a roll-over event.

Air bag assemblies typically include an inflatable cushion in fluid communication with a gas emitting inflator. Upon sensing certain predetermined vehicle conditions, such as a certain level of vehicle deceleration, the inflator discharges a fixed amount of inflator gas thereby forcing the air bag into a deployed position. The inflator gas occupies the available volume within the air bag cushion thereby forcing the air bag cushion to expand outwardly to the extent permitted by its construction. The pressure within the air bag cushion upon deployment is proportional to the quantity of inflator gas expelled into the air bag and inversely proportional to the volume occupied by the inflator gas within the air bag. As the occupant comes into contact with the expanded air bag, the inflator gas is forced out of the air bag thereby dissipating the kinetic energy of the occupant.

Absent restraint, an inflated body tends to assume a generally spherical profile. In order to provide control over the inflated shape of the air bag cushion, it is known to utilize tethering elements in the form of straps or webs extending between surfaces of the air bag cushion to thereby hold the surfaces in fixed orientation relative to one another upon inflation. The selection and length of such tethering elements can thus be used to establish a desired inflated profile. However, once the tethering elements are attached to the surface, the inflated geometry of the cushion is fixed and is not subject to adjustment.

As will be appreciated, the preferred inflated profile of the air bag cushion may vary depending upon the severity of the activating impact event and/or upon the size of the occupant to be protected and/or upon the position of the occupant to be protected. Thus, the ability to effectively control the inflation characteristics of the air bag cushion is potentially desirable. In order to provide a degree of control over the inflated profile of the air bag cushion it is known to use an inflator that has varied levels or stages of inflator gas output in response to the sensing of different vehicle or occupant conditions. Thus, it is generally known in the prior art to utilize so-called "dual-stage" inflators that discharge predetermined amounts of gas at one or two levels. However, these dual-stage inflators are more complex than typical inflators and have the limitation of typically providing only discrete levels of gas output. Moreover, the use of such dual-stage inflators provides control over only the amount of inflator gas which is discharged and does not provide control over the expanded geometry of the inflated air bag cushion. That is, so long as the air bag has a fixed volumetric capacity, the inflator gas will tend to fill that capacity and the expanded configuration of the air bag will be generally the same although the pressure will vary.

In order to provide an additional degree of freedom in the control of air bag performance, it has been suggested to utilize air bag cushions which incorporate sewn or woven in seams within the air bag to control the expanded geometry of the inflated air bag wherein the seams separate upon the introduction of pressures exceeding a certain level thereby freeing the air bag cushion from the restraint imposed by the seams at lower pressures. In order for such break-away seams to provide controlled expansion, the application of such seams must be performed with substantial precision such that seam separation will occur in a highly reproducible and predictable manner. As will be appreciated, due to the large number of variables involved in the introduction and separation of such break-away seams, such requisite precision and reproducibility may be difficult to achieve. Moreover, even when such breakaway seams are utilized, the expansion which occurs may be in all directions. In some applications it is believed that preferential expansion in the depth of the air bag (i.e. towards the occupant to be protected) may be desirable.

SUMMARY OF THE INVENTION

The present invention provides advantages and alternatives over the prior art by providing an air bag assembly including an inflatable air bag cushion operatively attached to one or more profile restricting tether elements having an operative length which may be selectively adjusted to provide desired inflation and impact response characteristics.

According to one aspect of the present invention, an air bag assembly is provided having an inflatable cushion selectively deployable to a controlled geometry desired in view of the position and/or size of the occupant to be protected such that an air bag of substantial depth and increased volume is available to protect occupants such as larger stature persons who are seated further away from the location of cushion deployment, while a smaller air bag volume of diminished depth is available to protect occupants such as smaller stature persons seated closer to the location of cushion deployment. A highly efficient mechanical release system may be used to adjust the operative length of internal tethers within the cushion thereby permitting enhanced controlled expansion of the cushion. Preferably the tethers maintain a degree of restraint across the surface of the cushion following adjustment.

According to another aspect of the present invention, an air bag assembly is provided having an inflatable cushion including a plurality of tethering elements extending between points of fixed connection at the surface of the cushion. At least a portion of the tethering elements are additionally attached along their length to the surface of the cushion at points of sliding connection between the points of fixed connection such that dynamic tensioning is maintained within the tethering elements over a range of inflation conditions.

The air bag assembly according to the present invention offers substantial versatility in the protection of large numbers of diverse occupants. Moreover, the air bag assembly of the present invention provides a simple, cost effective and highly reproducible mechanism for controlling the profile and performance of deployed air bag cushions even when using a traditional single stage inflator.

BRIEF DESCRIPTION OF THE DRAWINGS

The present invention will now be described by way of example only, with reference to the accompanying drawings which constitute a part of the specification herein and in which:

FIG. 1 is a cut-away view of a vehicle interior showing an air bag cushion in a stored undeployed state in opposing relation to a vehicle occupant;

FIG. 2 is a cut-away view of an exemplary air bag module including an inflator and one potential embodiment of an actuation mechanism for controlling the expansion of a tethered air bag cushion;

FIG. 3A illustrates an arrangement of profile restricting tethers of variable effective length as may be utilized in a variable profile air bag wherein the air bag is restrained to a diminished profile;

FIG. 3B is a view similar to FIG. 3A wherein the air bag is in an expanded profile configuration;

FIG. 4A illustrates an arrangement of profile restricting tethers of variable effective length as may be utilized in a variable profile air bag wherein the air bag is restrained to a diminished profile;

FIG. 4B is a view similar to FIG. 4A wherein the air bag is in an expanded profile configuration;

FIG. 5A illustrates an arrangement of profile restricting tethers of variable effective length as may be utilized in a variable profile air bag wherein the air bag is restrained to a diminished profile;

FIG. 5B is a view similar to FIG. 5A wherein the air bag is in an expanded profile configuration;

FIG. 6A illustrates an arrangement of profile restricting tethers of variable effective length as may be utilized in a variable profile air bag wherein the air bag is restrained to a diminished profile;

FIG. 6B is a view similar to FIG. 6A wherein the air bag is in an expanded profile configuration;

FIG. 7A illustrates an arrangement of profile restricting tethers of variable effective length as may be utilized in a variable profile air bag wherein the air bag is restrained to a diminished profile;

FIG. 7B is a view similar to FIG. 7A wherein the air bag is in an expanded profile configuration;

FIG. 8A illustrates an arrangement of profile restricting tethers of variable effective length as may be utilized in a variable profile air bag wherein the air bag is restrained to a diminished profile;

FIG. 8B is a view similar to FIG. 8A wherein the air bag is in an expanded profile configuration; and FIG. 9 illustrates an arrangement of profile restricting tethers for provision of dynamic tensioning during an impact event.

While the invention has been illustrated and generally described above and will hereinafter be described in connection with certain potentially preferred embodiments, procedures and practices, it is to be understood that in no event is the invention to be limited to such illustrated and described embodiments procedures and practices. On the contrary, it is intended that the present invention shall extend to all alternatives and modifications as may embrace the principles of this invention within the true spirit and scope thereof.

DESCRIPTION OF THE PREFERRED EMBODIMENTS

Reference will now be made to the drawings, wherein to the extent possible like reference numerals are utilized to designate like components throughout the various views. In FIG. 1 it is seen that a vehicle 10 may include a seating structure 12 which houses an occupant 14 in generally opposing relation to an instrument panel 16. An inflatable air bag cushion 20 may be housed within the instrument panel 16 for outward deployment towards the occupant 14 in the event of a collision.

While the air bag cushion 20 is illustrated for descriptive purposes in relation to a vehicle passenger, it is to be understood that the present invention is in no way intended to be limited to a passenger side configuration. On the contrary, it is contemplated that the present invention may have equal applicability to air bag deployment in opposing relation to the operator (not shown) of the vehicle from the steering column (not shown) as well as in relation to air bags deployed from other regions within the vehicle interior including, by way of example only, side-impact air bags and inflatable curtain structures.

It is contemplated that the vehicle interior will preferably include a seat position sensor 22 as the primary means of detecting the position of the occupant 14 relative to the instrument panel 16. It is further contemplated that the vehicle 10 may include additional position sensors such as an optical scanner 24 or the like to measure both the volume and position of the occupant to be protected. It is contemplated that the interior of the vehicle 10 may also be provided with a scale 26 disposed within the seating structure 12 so as to provide additional data regarding the load to which the inflatable air bag cushion 20 may be subjected. The seating structure 12 may also be provided with sensing elements to measure the degree to which the seating structure 12 is reclined. The vehicle 10 may also be provided with sensors to determine and communicate whether or not the occupant is utilizing the recommended seat belt structures 28. The data so collected may be utilized to determine desirable expanded profile characteristics for the air bag cushion 20 according to the present invention.

According to one form of the invention, the air bag cushion 20 has a first expanded profile and at least a second expanded profile which is characterized by less depth than the first expanded profile. One or more tethering elements 30 (FIGS. 3A–3B) in the form of straps are preferably utilized to control the inflated profile of the air bag cushion 20.

As best illustrated through simultaneous reference to FIGS. 3A and 3B, the tethering elements 30 are preferably disposed across the interior of the air bag cushion 20 and extend in a travel path between fixed points of connection 25 at the surface of the air bag cushion 20. As shown, the tethering elements 30 are preferably further connected to the surface of the air bag cushion 20 at locations along the travel path by guide elements 29 such as at an impact face protion 92. As shown in FIG. 3A, the operative length of the tethering elements 30 may be shortened by drawing a portion of the tethering elements 30 intermediate the fixed points of connection towards an anchoring structure remote from the air bag cushion 20. Such a shortening in the operative length of the tethering elements 30 causes the depth of the air bag cushion 20 to be restrained. As Shown in FIG. 3B, the operative length of the tethering elements 30 is increased when the tethering elements 30 are released from the anchoring position.

The release or retention of the tethering elements 30 is preferably carried out at the time of inflation of the air bag cushion 20 based upon the preferred profile character of the air bag cushion 20 in view of the measured physical character and position of the occupant 14. That is, if the physical character and orientation of the occupant 14 are such that a deep profile is desired for the inflatable air bag cushion 20, then the tethering elements are released from their anchored position to assume an increased operative length at the time of inflation thereby permitting the inflatable air bag cushion 20 to assume an expanded profile of enhanced depth. Conversely, in the event that the physical character and orientation of the occupant 14 are such that the inflatable air bag cushion 20 is preferably of a more shallow profile, then the tethering elements 30 remain anchored in a restricted operative length during deployment of the inflatable air bag cushion 20 so as to restrain the final profile thereof. In the potentially preferred embodiment of the present invention, the tethering elements 30 will at all times remain connected to at least two secure points of attachment 25 at locations across the surface of the air bag cushion. Such connection provides for the continued restraint of the air bag cushion 20 by the tethering elements even after the operative length is increased. That is, even with an enhanced operating length, the tethering elements continue to contour the profile of the air bag cushion 20.

By way of example only and not limitation, one possible mechanism for the controlled retention and release of the tethering elements 30 is shown in FIG. 2. As shown, in the illustrated embodiment one or more tethering elements 30 are operatively connected to an anchoring strap 31 which in turn is passed through the opening at the interior of a ring element 32 so as to form a loop 33 which can slide along the length of the ring element 32. The configuration of the loop 33 is thereafter maintained by attaching the surfaces of the looped anchoring strap 31 by stitching 34 along a length remote from the ring element 32. As will be appreciated, it is contemplated that a single tether 30 or multiple tethers may be operatively attached to the ring element either directly or through use of an anchoring strap 31. That is, the anchoring strap 31 may be eliminated if desired.

The material forming the tethering elements 30 and the anchoring strap 31 are preferably of pliable nature such as a woven or knitted textile of construction resistant to substantial elongation upon the application of tensile forces. A woven structure of nylon yarns may be preferred.

In the event that a ring element 32 is utilized to hold the tethering elements 30 in place, it is preferably formed from a smooth surface material of high strength such as metal or the like. Such materials have the ability to withstand substantial loading without undergoing plastic deformation. As will be discussed further hereinafter, the ring element 32 may pass in sliding relation over a retaining stud 48 which extends through the opening in the ring element 32 such that the ring element 32 may be pulled away from the retaining stud 48 when tension is applied to the tethering elements 30. In the event that the ring element 32 is not utilized, it is contemplated that this function may be carried out by the loop 33 which may likewise accept the retaining member therein. It is to be appreciated that while the illustrated embodiment utilizes a female member such as the ring element 32 or loop 33 disposed in sliding relation over a male retaining member, such a configuration for retaining the tethering elements in a shortened condition it is in no way critical to the present invention and any number of other releasable attachment mechanisms may likewise be utilized. Accordingly, by way of example only and not limitation, it is contemplated that the ring element 32 may be substituted with a male element for disposition in sliding relation within a supporting female retaining member if desired.

By way of example only, in one exemplary quick release system illustrated in FIG. 2, an actuation mechanism 36 including a support structure 38 is operatively connected to a gas emitting inflator 40 which is activated by an initiator 41 such as a pyrotechnic squib or other suitable device as will be well known to those of skill in the art. The gas emitting inflator 40 is stored within a housing 42 which may include one or more vent openings 43 for transmission of inflator gas outwardly from the module away from the air bag 20. As illustrated, such vent openings 43 are normally in fluid communication with gas discharge ports 44 generally surrounding the diffuser portion 45 of the inflator 40. As will be appreciated, while the support structure 38 of the actuation mechanism 36 is illustrated as being connected to the gas emitting inflator 40, it is likewise contemplated that any number of other arrangements may also be utilized. By way of example only, it is contemplated that the actuation mechanism 36 may be located remote from the inflator 140 and attached directly to the housing 42.

According to the illustrated embodiment, the ring element 32 or loop 33 on the anchor strap 31 is disposed in sliding relation over the retaining stud 48 which is secured in substantially stable relation to the housing 42. The retaining stud 48 is disposed in butting or notched relation to a tether blocking element 49 such as a plate or notched post. As will be appreciated, in such an arrangement the ring element 32 or loop 33 will be anchored in place with the retaining stud 48 and tether blocking element 49 preventing the withdrawal of the ring element 32 or loop 33 thereby holding the anchor strap 31 in place. The tethering elements 30 which are fixedly attached to the anchor strap 31 are likewise anchored against outward movement as best seen in FIG. 3A. Accordingly, the expanded profile of the air bag 20 is limited due to the anchored relation between the anchor strap 31 (or tethering elements 30) and the stationary retaining stud 48.

According to the illustrated embodiment, the tether blocking element 49 is carried within a plunger element 50 which is held within the interior of the support structure 38 at the end of the inflator 40. The support structure 38 has a substantially hollow tubular shape including interior walls 39 defining an axial opening into which the plunger element 50 and an initiator device 60 may be inserted during assembly.

The support structure 38 includes a first support end 70 of a substantially flanged configuration that is secured directly to the head portion of the inflator 40. The first support end 70 of the support structure 38 may be secured to the inflator 40 by any suitable method, such as welding. In the illustrated embodiment, the support structure 38 also includes a spacing shoulder 74 which is sized larger than an end opening in the housing 42 such that the support structure 38 is limited from going through the end opening within the housing 42 and is properly positioned during assembly. The spacing shoulder 74 is preferably integrally formed with the support structure 38 such as by machining or molding but may also be provided as a separate piece attached to or slipped over the support structure 38.

According to the illustrated embodiment, the support structure 38 includes a first guide channel 76 which extends longitudinally along at least a portion of the distance between the spacing shoulder 74 and the first support end 70 of the support structure 38 such that the tether blocking element 49 passes through the first guide channel 76 and into the plunger element 50 as shown. The support structure 38 further includes a threaded end portion 78 which extends past the spacing shoulder 74 through the end opening of the housing 42 for mating with a cap nut 80 to secure the inflator 40 and the actuation mechanism 36 to the housing 42.

In the illustrated embodiment, the plunger element 50 is preferably integrally formed from a plastic material and has a generally cylindrical shape. The plunger element 50 is seated within the interior walls 39 of the support structure 38 and has a diameter which is slightly smaller than the axial opening between the interior walls 39 such that the plunger element 50 is may slide relative to the interior walls 39. The plunger element 50 includes a first radial opening which is sized for the receipt of the tether blocking element 49. The plunger element 50 also includes a second radial plunger hole for the receipt of a moveable vent blocking device 85.

In the illustrated embodiment, the plunger element 50 includes a shear feature 52 which is illustrated as a flange located at the end of the plunger element 50. The shear feature 52 is preferably integrally formed with the plunger element 50, but may also be a separate piece attached to the plunger element 50. The shear feature 52 is sized larger than the axial opening within the support structure 38 such that the sheer feature 52 engages the support structure 38 during insertion to limit the insertion of the plunger element 50 into the support structure 38.

The plunger element 50 includes an axial plunger bore 54 in which the initiator device 60 such as a pyrotechnic squib, pneumatic actuator or the like is seated prior to activation. The initiator device 60 preferably is activated in response to a signal from a control device such as an on-board computer (not shown) based upon inputs from the seat position sensor 22, optical scanner 24 and any other sensor as may be used to measure the nature of the occupant arid the severity of the event taking place. Upon activation, the initiator device 60 produces a pressure wave that presses against a plunger reaction surface 57. The application of such force causes the shear feature 52 to break off and permits the plunger element 50 to slide within the support structure 38 until engaging the head of the inflator 40 which acts as a stop surface.

In the illustrated arrangement wherein a vent blocking element 85 is utilized in conjunction with the actuation mechanism 36, the vent blocking element 85 includes an upwardly projecting arm portion 86 which may be snap fittedly attached in the plunger element 50. The vent blocking element 85 also includes a slide portion 87 extending at generally a right angle to the arm portion 86. Thus, in the illustrated embodiment, the retaining stud 48, tether blocking element 49, and vent blocking element 85 are arranged in a substantially "Z" shaped cross sectional profile.

The vent blocking element 85 is moveable within a second guide channel 77 within the support structure 38 so as to close an inflator vent opening 43 upon activation of the initiator device 60. In FIG. 2, the slide portion 87 is shown in a first position in solid lines in which the inflator vent opening 43 is open thereby lowering the amount of gas available for inflation of the air bag cushion 20 and is illustrated in phantom lines in a second position in which the slide portion 87 is blocking the inflator vent opening 43 within the housing 142 thereby directing a larger quantity of available inflator gas into the air bag cushion 20.

In the illustrated exemplary embodiment, prior to activation of the inflator 40 the air bag cushion 20 is stored in a folded condition atop the inflator 40. Also, prior to activation of the inflator 40, the tether blocking element 49 as well as the optional vent blocking element 85 are held in a first position by the shear feature 52 such that the retaining stud 48 and tether blocking element 49 hold the anchor strap 31 in place. In addition, the slide portion 87 of the vent blocking element 85 is misaligned with the inflator vent opening 43 such that the inflator vent opening 43 is open thereby permitting the egress of inflator gas outwardly from the housing 42.

Upon sensing predetermined vehicle and occupant conditions, a signal is sent to the inflator initiator 41 thereby activating the inflator 40. Based upon the measurement of occupant conditions including the position and/or physical character of the occupant 14 as measured by the seat position sensor 22, optical scanner 24 and other sensors as may be utilized, a signal is also sent to the initiator device 60 advising the initiator device 60 as to whether the first position is to be maintained or whether the initiator device 60 is to be activated at a predetermined time during activation of the inflator 40 to move the tether blocking element 49 thereby permitting the anchor strap 31 to slide away from the retaining stud 48. According to the potentially preferred practice, the initiator device 60 is activated when conditions indicate that a deeper profile and larger volume is required and will remain in a deactivated state when conditions indicate that an air bag of more shallow profile and lower volume is desirable.

As previously indicated, upon activation the initiator device 60 produces a pressure wave which presses against the reaction surface 57 of the plunger element 50 and quickly forces the plunger element 50 towards the head portion of the inflator 40. This movement carries the tether blocking element 49 as well as any optional vent blocking element 85 within the plunger element 50 from the first position illustrated in FIG. 2 to a second position wherein the plunger element 50 is in contact with the head portion of the inflator 40. Such movement rapidly opens a path of egress for the ring element 32 or loop 33 disposed over the retaining stud 48 thereby permitting the ring element 32 or loop 33 to slide out of engagement with the retaining stud 48 as tension is applied to the anchor strap 31. This tension arises due to the outward expansion of the air bag cushion 20 as it is filled with inflator gas. Preferably such tension will include both a horizontal as well as a vertical force component arising from the angled relation between the anchor strap 31 and the retaining stud 48 so as to promote sliding disengagement from the retaining stud 48. Simultaneously with such disengagement, the vent blocking element 85 covers the vent opening 43 thereby increasing the quantity of inflation gas available to inflate the air bag cushion 20.

As illustrated through simultaneous reference to FIGS. 3A and 3B, in the event that the actuation mechanism 36 associated with the variable profile air bag cushion 20 is activated, the effective length of the tethering elements 30 is increased from the arrangement in FIG. 3A thereby permitting the air bag 20 to assume a substantially extended profile and increased volume as illustrated in FIG. 3B. In the illustrated arrangement, when the anchoring strap 31 is released the tethering elements 30 are permitted to move outwardly with the air bag cushion. However, the tethering elements 30 nonetheless remain secured at the surface of the air bag cushion at the fixed points of connection 25 such that even in the fully inflated state, the tethering elements 30 apply shaping tension to the surface of the air bag cushion 20. It has been found that maintaining such a stable connective relationship may be used to provide a continued degree of control over the final expanded profile of the air bag 20. More particularly, it has been found that by maintaining some degree of tethering the available increased volume of the air bag 20 may be used to selectively increase the depth dimension of the final expanded profile far more than would naturally occur if tethering restraint is eliminated entirely. As will be appreciated, the incorporation of the vent blocking element 85 for operation in conjunction with the variable volume actuation mechanism 36 permits the discharge of an enhanced quantity of inflator gas into the air bag cushion 20 in the larger expanded condition of FIG. 3B without the need for any additional initiating device.

According to a first tethering arrangement illustrated in FIGS. 3A and 3B, at least one tethering element 30 in the form of a strap passes in sliding relation through two guide elements 29 in the form of loop structures at the surface of the air bag cushion 20. While for explanatory purposes only a single tethering element 30 is illustrated, it is to be understood that a plurality of such tethering elements are preferably utilized across the interior of the air bag cushion 20 as necessary to define a desired inflated condition. The guide elements 29 secure the tethering element 30 against movement away from the surface at the location of the guide elements 29. The ends of the tethering element 30 are further fixedly attached to the air bag cushion at the secure points of attachment 25 which may be either internal or external to the air bag cushion 20. As illustrated, the tethering element 30 passes along the surface of the air bag cushion 20 in a travel path extending through the guide elements 29 which are arranged intermediate the secure points of attachment 25 such as in the vicinity of an impact face portion 92 of the air bag cushion 20. While two guide elements 29 are illustrated, it is contemplated that the tethering element 30 may pass through a single guide element or through more than two guide elements if desired. However, the tethering element 30 is preferably supported at the surface of the air bag cushion 20 at at least one location between the secure points of attachment 25 to establish a three point connection between the tethering element 30 and the air bag cushion 20.

In the illustrated embodiment, the portion of the tethering element 30 between the guide elements 29 is drawn down towards the retaining stud 48 and held in place by the anchoring strap 31. As illustrated in FIG. 3B, upon release of the tethering element 30 from the retaining stud 48 in the manner as described above, the air bag cushion 20 expands outwardly to an extended profile. However, according to the potentially preferred practice, the extended profile is nonetheless restrained by the secure attachment of the tether element 30 at the secure points of attachment 25. The maintenance of such a tethering relationship permits the air bag cushion 20 to adopt a generally deep elongated profile as shown without requiring the actual volumetric capacity to be substantially increased.

In FIGS. 4A and 4B there is illustrated yet another variable profile air bag arrangement wherein elements are designated by like reference numerals to those used in FIGS. 3A and 3B increased by 100. As shown, according to this embodiment, at least one tether element 130 is passed through a series of guide elements 129 in the form of loop structures at the surface of the air bag cushion 120 such as in the vicinity of an impact face portion 192. One end of the tethering element 130 is held in place at a first secure point of attachment 125 which may be either internal or external to the air bag cushion 120. The other end of the tethering element 130 is releasably held in place at the retaining stud 148. As illustrated, such an arrangement gives rise to an increased horizontal force component when tension is applied by the tethering element 130. An anchoring strap 131 joins a section of the tethering element 130 between the retaining stud 148 and the guide elements 129 to a second secure point of attachment 125' which may be either internal or external to the air bag cushion 120. Of course, the tethering element 130 may likewise be attached directly at the second secure point of attachment 125' in which case the anchoring strap 131 may be located between the tethering element 130 and the retaining stud 148.

As illustrated in FIG. 4B, upon release of the tethering element 130 from the retaining stud 148 in the manner as described above, the air bag cushion 120 expands outwardly to an extended profile. However, according to the potentially preferred practice, the extended profile is nonetheless restrained by the secure attachment of the tethering element 130 at the secure points of attachment 125, 125'. The maintenance of such a tethering relationship permits the air bag cushion 120 to adopt a generally deep elongated profile as shown without requiring the actual volumetric capacity to be substantially increased.

In FIGS. 5A and 5B there is illustrated yet another variable profile air bag arrangement wherein elements as previously described are designated by like reference numerals increased by 200. According to this arrangement, at least one tethering element 230 in the form of a strap passes in sliding relation through two elongate guide elements 229 in the form of sleeve structures at the impact surface 292 of the air bag cushion 220. While for explanatory purposes only a single tethering element 230 is illustrated, it is to be understood that a plurality of such tethering elements are preferably utilized across the interior of the air bag cushion 220 as necessary to define a desired inflated condition. The guide elements 229 secure the tethering element 230 against movement away from the surface at the location of the guide elements 229. The ends of the tethering element 230 are further fixedly attached to the air bag cushion at the secure points of attachment 225 which may be either internal or external to the air bag cushion 220. As illustrated, the tethering element 230 passes in a travel path through the guide elements 229 which are arranged along the travel path intermediate the secure points of attachment 225. While two guide elements 229 are illustrated, it is contemplated that the tethering element 230 may likewise pass through a single guide element or through more than two guide elements if desired. However, the tethering element 230 is preferably supported at the surface of the air bag cushion 220 at at least one zone of attachment between the secure points of attachment 225.

In the illustrated embodiment, the portion of the tethering element 230 between the guide elements 229 is drawn down towards the retaining stud 248 and held in place by the anchoring strap 231. As illustrated in FIG. 5B, upon release of the tethering element 230 from the retaining stud 248 in the manner as described above, the air bag cushion 220 expands outwardly to an extended profile. However, according to the potentially preferred practice, the extended profile is nonetheless restrained by the secure attachment of the tether element 230 at the secure points of attachment 225. The maintenance of such a tethering relationship permits the air bag cushion 220 to adopt a generally deep elongated profile as shown without requiring the actual volumetric capacity to be substantially increased.

In FIGS. 6A and 6B there is illustrated yet another variable profile air bag arrangement wherein like elements to those previously described are designated by like reference numerals increased by 300. As shown, according to this embodiment, at least one tether element 330 is passed through a guide element 329 in the form of an elongate sleeve structure at the surface of the air bag cushion 320 such as beneath the impact surface portion 392. One end of the tethering element 330 is held in place at a first secure point of attachment 325 which may be either internal or external to the air bag cushion 320. The other end of the tethering element 330 is releasably held in place at the retaining stud 348. As illustrated, such an arrangement gives rise to an increased horizontal force component when tension is applied by the tethering element 330. An anchoring strap 331 joins a section of the tethering element 330 between the retaining stud 348 and the guide element 329 to a second secure point of attachment 325' which may be either internal or external to the air bag cushion 320. Of course, the tethering element 330 may likewise be attached directly at the second secure point of attachment 325' in which case the anchoring strap 331 may be located between the tethering element 330 and the retaining stud 348.

As illustrated in FIG. 6B, upon release of the tethering element 330 from the retaining stud 348 in the manner as described above, the air bag cushion 320 expands outwardly to an extended profile. However, according to the potentially preferred practice, the extended profile is nonetheless restrained by the secure attachment of the tethering element 330 at the secure points of attachment 325, 325'. The maintenance of such a tethering relationship permits the air bag cushion 320 to adopt a generally deep elongated profile as shown without requiring the actual volumetric capacity to be substantially increased.

In FIGS. 7A and 7B there is illustrated yet another variable profile air bag arrangement wherein elements as previously described are designated by like reference numerals increased by 400. According to this arrangement, at least one tethering element 430 in the form of a strap passes in sliding relation through a series of guide elements 429 in the form of loop or sleeve structures at the surface of the air bag cushion 420. While for explanatory purposes only a single tethering element 430 is illustrated, it is to be understood that a plurality of such tethering elements are preferably utilized across the interior of the air bag cushion 420 as necessary to define a desired inflated condition. The guide elements 429 secure the tethering element 430 against movement away from the surface at the location of the guide elements 429. The ends of the tethering element 230 are further fixedly attached to the air bag cushion at the secure points of attachment 425 which may be either internal or external to the air bag cushion 420.

As illustrated, the tethering element 430 passes in a travel path through the guide elements 429 which are arranged along the travel path intermediate the secure points of attachment 225. As illustrated, one or more of the guide elements 429 hold the tethering element 430 against the side portion 491 of the air bag cushion 420. Other of the guide elements 429 preferably serve to secure the tethering element in the vicinity of the impact face portion 492 of the air bag cushion. As best seen in FIG. 7A, the utilization of guide elements 429 at the side portions 491 of the air bag cushion causes the side portions 491 of the inflated air bag cushion 420 to be pulled inwardly when the tethering element 430 is in a shortened anchored state. Such contouring may permit the impact face portion 492 to be projected outwardly in a more rapid manner and/or permit lower volumes of inflation gas to be utilized. As illustrated in FIG. 7B, upon release of the tethering element 430 from the shortened anchored state in the manner as described above, the air bag cushion 420 expands outwardly to an extended profile and width. However, according to the potentially preferred practice, the air bag cushion 420 is nonetheless restrained by the secure attachment of the tether element 430 at the secure points of attachment 425.

In FIGS. 8A and 8B there is illustrated yet another variable profile air bag arrangement wherein elements as previously described are designated by like reference numerals increased by 500. According to this arrangement, at least one tethering element 530 in the form of a strap passes in sliding relation through guide elements 529 in the form of loop or sleeve structures at the surface of the air bag cushion 520 such as in the vicinity of the impact surface portion 592. While for explanatory purposes only a single tethering element 530 is illustrated, it is to be understood that a plurality of such tethering elements may be utilized across the interior of the air bag cushion 520 as necessary to define a desired inflated condition. The guide elements 529 secure the tethering element 530 against movement away from the surface at the location of the guide elements 529. The ends of the tethering element 530 are further fixedly attached to the air bag cushion 520 at the secure points of attachment 525 which may be either internal or external to the air bag cushion 520.

As illustrated, the tethering element 530 passes in a travel path through the guide elements 529 which are arranged along the travel path intermediate the secure points of attachment 525. As illustrated, in this embodiment side panel tethering lines 594 extend from fixed side panel connection points 595 inwardly towards the anchoring strap 531 connecting the tethering element 530 to the retaining stud 548. During assembly, the anchoring strap 531 is passed through ring structures 596 at the distal ends of the side panel tethering lines 594. As will be appreciated, the inner diameter of the ring structures 596 on the side panel tethering lines 594 is larger than the outer diameter of the ring structure 532 at the end of the anchoring strap 531 to permit the desired pass through relationship. As best seen in FIG. 8A, the length of the side panel tethering lines 594 is such that the side portions 591 of the inflated air bag cushion 520 are pulled inwardly when the side panel tethering lines 594 are held in place at the anchoring strap 531. Such contouring may permit the impact face portion 592 to be projected outwardly in a more rapid manner and/or permit lower volumes of inflation gas to be utilized.

As illustrated in FIG. 8B, upon release of the anchoring strap 531 in the manner as described above, the side panel tethering lines 594 are released from their attached relation to the anchoring strap 531 as the anchoring strap 531 is pulled through the ring structures 596 at the ends of the side panel tethering lines 594. This release permits the air bag cushion 520 to expand outwardly to an extended profile and width. However, according to the potentially preferred practice, the air bag cushion 520 is nonetheless restrained by the secure attachment of the tether element 530 at the secure points of attachment 525 to maintain a degree of control over the final inflated geometry.

As will be appreciated from the exemplary embodiments described above, it is to be understood that the present invention may embody any number of arrangements for the tethering elements depending upon the desired inflated profile for the air bag cushion. Moreover, the present invention further contemplates that the use of tethering arrangements making use of guide elements which permit sliding attachment of the tethering elements between fixed points of connection may provide substantial advantages even without the use of a depth adjusting release system. One such arrangement is illustrated in FIG. 9 wherein elements corresponding to those previously described are designated by like reference numerals increased by 600. As shown, in this arrangement a first tethering element 630 in the form of a strap passes along a travel path from a first secure point of attachment 625 such as at a forward center panel of the air bag cushion 620 through a travel guide element 629 at the impact face 692 of the air bag cushion 620. The first tethering element thereafter angles away from the impact face to a side portion 691 of the air bag cushion for attachment at a second secure point of attachment 635. In like manner, a second tethering element 630' in the form of a strap passes along a travel path from a first secure point of attachment 625' such as at a forward center panel of the air bag cushion 620 through a travel guide element 629' at the impact face 692 of the air bag cushion 620. The second tethering element 630' thereafter angles away from the impact face 692 to a side portion 691 of the air bag cushion 620 for attachment at a second secure point of attachment 635'. This arrangement of the tethering elements 630, 630' causes the sides of the air bag cushion 620 to be pulled in upon initial inflation of the air bag cushion 620. However, upon subsequent compression of the air bag cushion such as will be caused by impact of a person to be protected, the sides of the air bag cushion 620 retain their ability to spread outwardly due to the sliding relation between the tethering elements 630, 630' and the guide elements 629, 629'. The tethering elements 630, 630' nonetheless remain tensioned during this spreading event. The controlled outward spread of the sides may aid in the controlled transfer of energy between the air bag cushion 420 and the person to be protected.

It is to be understood that while the present invention has been illustrated and described in relation to potentially preferred embodiments, constructions, and procedures, that such embodiments, constructions, and procedures are illustrative only and that the present invention is in no event to be limited thereto. Rather, it is contemplated that modifications and variations embodying the principles of the present invention will no doubt occur to those of skill in the art. In particular, it is to be understood that the present invention is in no way limited to any particular mechanism for the retention and release of tethering elements and that all description of such mechanisms is explanatory and exemplary only. It is therefore contemplated and intended that the present invention shall extend to all such modifications and variations as may incorporate the broad aspects of the present invention within the full spirit and scope thereof.

What is claimed is:

1. An air bag assembly for cushioning restraint of a vehicle occupant during an impact event, the air bag assembly comprising:

an inflatable air bag cushion adapted to be inflated to assume an inflated profile when connected to a gas generating inflator such that upon discharge of inflation gas from the inflator the air bag cushion is inflated to a deployed state from a location of deployment in substantially opposing relation to the occupant;

at least one profile restraining tether element operatively secured to the air bag cushion at a first point of secure attachment and at a second point of secure attachment such that an operative tethering segment of predefined length extends between the first point of secure attachment and the second point of secure attachment, at least a portion of the operative tethering segment being supported at an interior surface of the air bag cushion by at least one guide element disposed across the interior surface such that the operative tethering segment is moveable in sliding relation through said at least one guide element, the tether element being operatively connected to an anchoring element adapted to be anchored in releasable relation to a support structure separate from the first point of secure attachment and the second point of secure attachment by drawing a portion of the operative tethering segment through said at least one guide element and towards the support structure such that the tether element restrains the inflated profile of the air bag cushion to a first depth when the anchoring element is anchored to the support structure, the anchoring element being releasable from anchoring relation to the support structure in response to an activation signal such that the tether element restrains the air bag cushion to a second depth which is greater than said first depth when the anchoring element is released from the support structure.

2. The air bag assembly according to claim 1, wherein the anchoring element comprises an elongate anchoring strap affixed to the tether element between the first point of secure attachment and the second point of secure attachment.

3. The air bag assembly according to claim 1, wherein said at least one guide element comprises an elongate sleeve element disposed along the interior surface of the air bag cushion.

4. The air bag assembly according to claim 3, wherein the elongate sleeve element is at least partially disposed along the interior surface of an impact face portion of the air bag cushion.

5. An air bag assembly for cushioning restraint of a vehicle occupant during an impact event, the air bag assembly comprising:

an inflatable air bag cushion adapted to be inflated to assume an inflated profile when connected to a gas generating inflator such that upon discharge of inflation gas from the inflator the air bag cushion is inflated to a deployed state from a location of deployment in substantially opposing relation to the occupant;

at least one profile restraining tether element operatively secured to the air bag cushion at a first point of secure attachment and at a second point of secure attachment such that an operative tether segment of predefined length extends between the first point of secure attachment and the second point of secure attachment, at least a portion of the operative tether segment being supported at an interior surface of the air bag cushion by a plurality of guide elements disposed across the interior surface such that the operative tether segment is moveable in sliding relation through said guide elements, the tether element being operatively connected to an anchoring element adapted to be anchored in releasable relation to a support structure separate from the first point of secure attachment and the second point of secure attachment by drawing a portion of the operative tether segment through said guide elements and towards the support structure such that the tether element restrains the inflated profile of the air bag cushion to a first depth when the anchoring element is anchored to the support structure, the anchoring element being releasable from anchoring relation to the support structure in response to an activation signal such that the tether element restrains the air bag cushion to a second depth which is greater than said first depth when the anchoring element is released from the support structure.

6. The air bag assembly according to claim 5, wherein the anchoring element comprises an elongate anchoring strap affixed to the tether element between the first point of secure attachment and the second point of secure attachment.

7. The air bag assembly according to claim 5, wherein one or more of said guide elements comprise elongate sleeve elements disposed along the interior surface of the air bag cushion.

8. The air bag assembly according to claim 5, wherein one or more of said guide elements comprise elongate sleeve elements at least partially disposed along the interior surface of an impact face portion of the air bag cushion.

* * * * *